(12) United States Patent
Yokota

(10) Patent No.: US 11,633,937 B2
(45) Date of Patent: Apr. 25, 2023

(54) SKIN FOAM-IN-PLACE FOAMED ARTICLE AND PRODUCTION METHOD THEREOF

(71) Applicant: INOAC CORPORATION, Aichi (JP)

(72) Inventor: Takayuki Yokota, Aichi (JP)

(73) Assignee: INOAC CORPORATION, Nagoya (JP)

( * ) Notice: Subject to any disclaimer, the term of this patent is extended or adjusted under 35 U.S.C. 154(b) by 1177 days.

(21) Appl. No.: 15/998,650

(22) PCT Filed: Feb. 15, 2017

(86) PCT No.: PCT/JP2017/005541
§ 371 (c)(1),
(2) Date: Aug. 16, 2018

(87) PCT Pub. No.: WO2017/141972
PCT Pub. Date: Aug. 24, 2017

(65) Prior Publication Data
US 2020/0331176 A1    Oct. 22, 2020

(30) Foreign Application Priority Data

Feb. 17, 2016    (JP) .............................. JP2016-027681

(51) Int. Cl.
*B32B 5/14*    (2006.01)
*B32B 5/18*    (2006.01)
(Continued)

(52) U.S. Cl.
CPC ............ *B32B 5/145* (2013.01); *B29C 44/129* (2013.01); *B29C 44/1257* (2013.01);
(Continued)

(58) Field of Classification Search
None
See application file for complete search history.

(56) References Cited

U.S. PATENT DOCUMENTS

| | | | | |
|---|---|---|---|---|
| 3,443,007 A * | 5/1969 | Hardy | ................. | B29C 44/5636 264/327 |
| 4,456,571 A * | 6/1984 | Johnson | .................. | B29C 44/22 264/53 |
| 4,544,598 A * | 10/1985 | Meiller | ............... | B29C 44/1285 428/318.6 |
| 4,832,770 A * | 5/1989 | Nojiri | ..................... | C08L 53/00 264/45.9 |

(Continued)

FOREIGN PATENT DOCUMENTS

| | | | | | |
|---|---|---|---|---|---|
| DE | | 4401556 A1 * | 7/1995 | ............... | B32B 5/18 |
| DE | | 29612504 U1 * | 9/1996 | ............... | B60N 2/48 |

(Continued)

OTHER PUBLICATIONS

Machine Translation of JP-63019232-A, Jan. 1988 (Year: 1988).*
(Continued)

*Primary Examiner* — Jeffrey A Vonch
(74) *Attorney, Agent, or Firm* — Sughrue Mion, PLLC

(57) ABSTRACT

There is provided a skin foam-in-place foamed article comprising a pad (15) and a bag-like outer material (20) covering the pad (15). The outer material (20) has a top layer (21) and a liner layer (22) made of a foamed resin. The liner layer (22) has a closed cell structure. A pad-side skin layer (27a) having a density higher than that of a bulk layer (26) is provided on the liner layer (22), on a side of the pad (15). A corona treatment is applied to the pad-side skin layer (27a).

21 Claims, 9 Drawing Sheets

(51) Int. Cl.

| | | |
|---|---|---|
| *B32B 5/20* | (2006.01) | |
| *B32B 5/32* | (2006.01) | |
| *B32B 7/12* | (2006.01) | |
| *B32B 27/06* | (2006.01) | |
| *B32B 27/16* | (2006.01) | |
| *B32B 27/32* | (2006.01) | |
| *B32B 27/40* | (2006.01) | |
| *B32B 33/00* | (2006.01) | |
| *B32B 37/12* | (2006.01) | |
| *B32B 38/00* | (2006.01) | |
| *B29C 44/12* | (2006.01) | |
| *B29C 44/14* | (2006.01) | |
| *B29C 44/18* | (2006.01) | |
| *B29C 44/22* | (2006.01) | |
| *B29C 44/30* | (2006.01) | |
| *B60N 2/58* | (2006.01) | |
| *B60N 2/80* | (2018.01) | |
| *B60N 2/70* | (2006.01) | |
| *B29C 59/10* | (2006.01) | |
| *B32B 1/06* | (2006.01) | |
| *B29C 39/10* | (2006.01) | |
| *B29C 39/24* | (2006.01) | |
| *B29C 39/38* | (2006.01) | |
| *B29K 75/00* | (2006.01) | |
| *B29K 105/04* | (2006.01) | |
| *B29K 623/00* | (2006.01) | |
| *B29L 31/30* | (2006.01) | |
| *B32B 37/00* | (2006.01) | |
| *B32B 1/02* | (2006.01) | |
| *B32B 5/24* | (2006.01) | |
| *B32B 3/26* | (2006.01) | |

(52) U.S. Cl.
CPC .......... *B29C 44/145* (2013.01); *B29C 44/184* (2013.01); *B29C 44/22* (2013.01); *B29C 59/10* (2013.01); *B32B 1/06* (2013.01); *B32B 5/147* (2013.01); *B32B 5/18* (2013.01); *B32B 5/20* (2013.01); *B32B 5/32* (2013.01); *B32B 7/12* (2013.01); *B32B 27/065* (2013.01); *B32B 27/16* (2013.01); *B32B 27/32* (2013.01); *B32B 27/40* (2013.01); *B32B 33/00* (2013.01); *B32B 38/0008* (2013.01); *B60N 2/5875* (2013.01); *B60N 2/7017* (2013.01); *B60N 2/80* (2018.02); *B29C 39/10* (2013.01); *B29C 39/24* (2013.01); *B29C 39/38* (2013.01); *B29C 44/1228* (2013.01); *B29C 44/181* (2013.01); *B29C 44/30* (2013.01); *B29C 44/304* (2013.01); *B29K 2023/06* (2013.01); *B29K 2075/00* (2013.01); *B29K 2105/04* (2013.01); *B29K 2105/046* (2013.01); *B29K 2623/06* (2013.01); *B29K 2715/003* (2013.01); *B29L 2031/3023* (2013.01); *B32B 1/02* (2013.01); *B32B 3/26* (2013.01); *B32B 5/245* (2013.01); *B32B 37/12* (2013.01); *B32B 2037/0092* (2013.01); *B32B 2038/0052* (2013.01); *B32B 2038/0076* (2013.01); *B32B 2038/0084* (2013.01); *B32B 2266/025* (2013.01); *B32B 2266/0278* (2013.01); *B32B 2266/08* (2013.01); *B32B 2266/10* (2016.11); *B32B 2305/022* (2013.01); *B32B 2307/50* (2013.01); *B32B 2307/5825* (2013.01); *B32B 2310/14* (2013.01); *B32B 2323/04* (2013.01); *B32B 2323/10* (2013.01); *B32B 2375/00* (2013.01); *B32B 2605/003* (2013.01); *B32B 2605/08* (2013.01); *B60N 2/58* (2013.01); *B60N 2/70* (2013.01); *Y10T 428/2495* (2015.01); *Y10T 428/24992* (2015.01); *Y10T 428/249961* (2015.04); *Y10T 428/249977* (2015.04); *Y10T 428/249981* (2015.04); *Y10T 428/266* (2015.01); *Y10T 428/269* (2015.01); *Y10T 428/27* (2015.01)

(56) References Cited

U.S. PATENT DOCUMENTS

| | | | | |
|---|---|---|---|---|
| 4,891,081 | A * | 1/1990 | Takahashi | B60R 19/22 264/45.2 |
| 4,959,184 | A * | 9/1990 | Akai | B29C 44/1209 264/40.3 |
| 5,053,271 | A * | 10/1991 | Mori | A47C 7/18 428/317.1 |
| 5,075,162 | A * | 12/1991 | Okubo | B29C 70/78 428/317.1 |
| 5,242,750 | A * | 9/1993 | Wagner | B29C 63/0017 428/319.3 |
| 5,456,976 | A * | 10/1995 | LaMarca, II | B29C 45/14811 428/317.1 |
| 5,460,873 | A * | 10/1995 | Ogawa | B32B 5/24 427/370 |
| 5,512,361 | A * | 4/1996 | Takeuchi | B32B 3/266 428/319.3 |
| 2001/0028950 | A1* | 10/2001 | Chujo | B32B 3/02 264/46.8 |
| 2003/0098113 | A1* | 5/2003 | Takei | B29D 99/0092 156/93 |
| 2003/0228455 | A1* | 12/2003 | Panczyk | B29C 44/145 428/304.4 |
| 2004/0229013 | A1* | 11/2004 | Dooley | B32B 5/18 264/46.5 |
| 2004/0256904 | A1* | 12/2004 | Takei | B29C 44/1209 297/452.48 |
| 2005/0181196 | A1* | 8/2005 | Aylward | G03G 7/008 428/314.4 |
| 2005/0206027 | A1* | 9/2005 | Asano | B29C 44/105 264/46.4 |
| 2006/0079589 | A1* | 4/2006 | Tadokoro | C08G 18/4018 521/155 |
| 2006/0147697 | A1* | 7/2006 | Medina-Galarza | B29C 45/372 264/266 |
| 2006/0165951 | A1* | 7/2006 | Holeschovsky | D06N 7/0076 428/95 |
| 2007/0166527 | A1* | 7/2007 | Yabe | A47C 27/15 442/221 |
| 2010/0062235 | A1* | 3/2010 | Nadella | B32B 27/308 428/213 |
| 2011/0014835 | A1* | 1/2011 | Sieradzki | C08J 9/0061 521/134 |
| 2011/0081524 | A1* | 4/2011 | Nadella | B29C 44/0461 428/213 |
| 2012/0101179 | A1* | 4/2012 | Purcell | C08J 9/0061 521/134 |
| 2012/0213880 | A1 | 8/2012 | Nii et al. | |
| 2013/0059146 | A1* | 3/2013 | Lee | B32B 27/32 156/324 |
| 2014/0062162 | A1* | 3/2014 | Tabata | B60N 2/5883 112/475.08 |
| 2015/0273740 | A1* | 10/2015 | Tsumura | B29C 48/307 264/45.9 |
| 2016/0185025 | A1* | 6/2016 | Baldwin | B29C 44/505 264/415 |
| 2017/0334708 | A1* | 11/2017 | Cheon | B60N 2/7017 |
| 2018/0290350 | A1* | 10/2018 | Tabata | B29C 39/10 |

FOREIGN PATENT DOCUMENTS

| | | | | |
|---|---|---|---|---|
| EP | 646542 | A2 * | 4/1995 | ............ B29C 44/04 |
| FR | 2944228 | A1 * | 10/2010 | ........... B29C 44/145 |
| GB | 2221183 | A * | 1/1990 | ......... B29C 44/1261 |
| JP | 53008664 | A * | 1/1978 | |

(56) References Cited

FOREIGN PATENT DOCUMENTS

| JP | 60036085 | A | * | 2/1985 | |
|----|----------|---|---|--------|--|
| JP | 60127116 | A | * | 7/1985 | |
| JP | 61293837 | A | * | 12/1986 | |
| JP | 63019232 | A | * | 1/1988 | |
| JP | 63035314 | A | * | 2/1988 | |
| JP | 01178286 | A | * | 7/1989 | |
| JP | 03114742 | A | * | 5/1991 | |
| JP | 04163110 | A | * | 6/1992 | |
| JP | 04185428 | A | * | 7/1992 | |
| JP | 04314507 | A | * | 11/1992 | |
| JP | 05329978 | A | * | 12/1993 | |
| JP | 06023895 | A | * | 2/1994 | |
| JP | 07164588 | A | * | 6/1995 | ............... B32B 5/18 |
| JP | 7-256765 | A | | 10/1995 | |
| JP | 07256765 | A | * | 10/1995 | |
| JP | 11080408 | A | * | 3/1999 | ......... B29C 44/3453 |
| JP | 11320734 | A | * | 11/1999 | |
| JP | 2000072911 | A | * | 3/2000 | |
| JP | 2000-280388 | A | | 10/2000 | |
| JP | 2000301645 | A | * | 10/2000 | |
| JP | 2002046164 | A | * | 2/2002 | |
| JP | 2002-210271 | A | | 7/2002 | |
| JP | 2003025369 | A | * | 1/2003 | |
| JP | 2005-336356 | A | | 12/2005 | |
| JP | 2009274326 | A | * | 11/2009 | ......... B29C 44/3453 |
| JP | 2010214997 | A | * | 9/2010 | ......... B29C 44/3453 |
| JP | 2011235775 | A | * | 11/2011 | |
| JP | 2012006212 | A | * | 1/2012 | |
| JP | 2014-97631 | A | | 5/2014 | |
| KR | 2013120567 | A | * | 11/2013 | ............. B29C 45/16 |
| WO | WO-9210119 | A1 | * | 6/1992 | ............... A47C 7/18 |
| WO | WO-0103927 | A1 | * | 1/2001 | ....... B29C 45/14811 |
| WO | WO-2008145372 | A1 | * | 12/2008 | ............. B32B 27/08 |
| WO | WO-2014038573 | A1 | * | 3/2014 | ........... B29C 44/145 |

OTHER PUBLICATIONS

Machine Translation of JP-2002210271-A, Jul. 2002 (Year: 2002).*
Machine Translation of WO-2008145372-A1, Dec. 2008 (Year: 2008).*
Machine Translation of JP-2011235775-A, Nov. 2011 (Year: 2011).*
Machine Translation of JP 07-164588 A, Jun. 1995 (Year: 1995).*
Communication dated Nov. 27, 2019, from the State Intellectual Property Office of People's Republic of China in counterpart Application No. 201780012752.1.
"Selected Papers on Study of Pipeline Science" China Petroleum and natural gas pipeline Science Research Institute, Tsinghua University Press, Oct. 1994, (6 pages total).
International Search Report (PCT/ISA/210), issued by International Searching Authority in corresponding International Application No. PCT/JP2017/005541, dated Mar. 28, 2017.
Written Opinion (PCT/ISA/237) issued by the International Searching Authority in corresponding International Application No. PCT/JP2017/005541, dated Mar. 28, 2017.

* cited by examiner

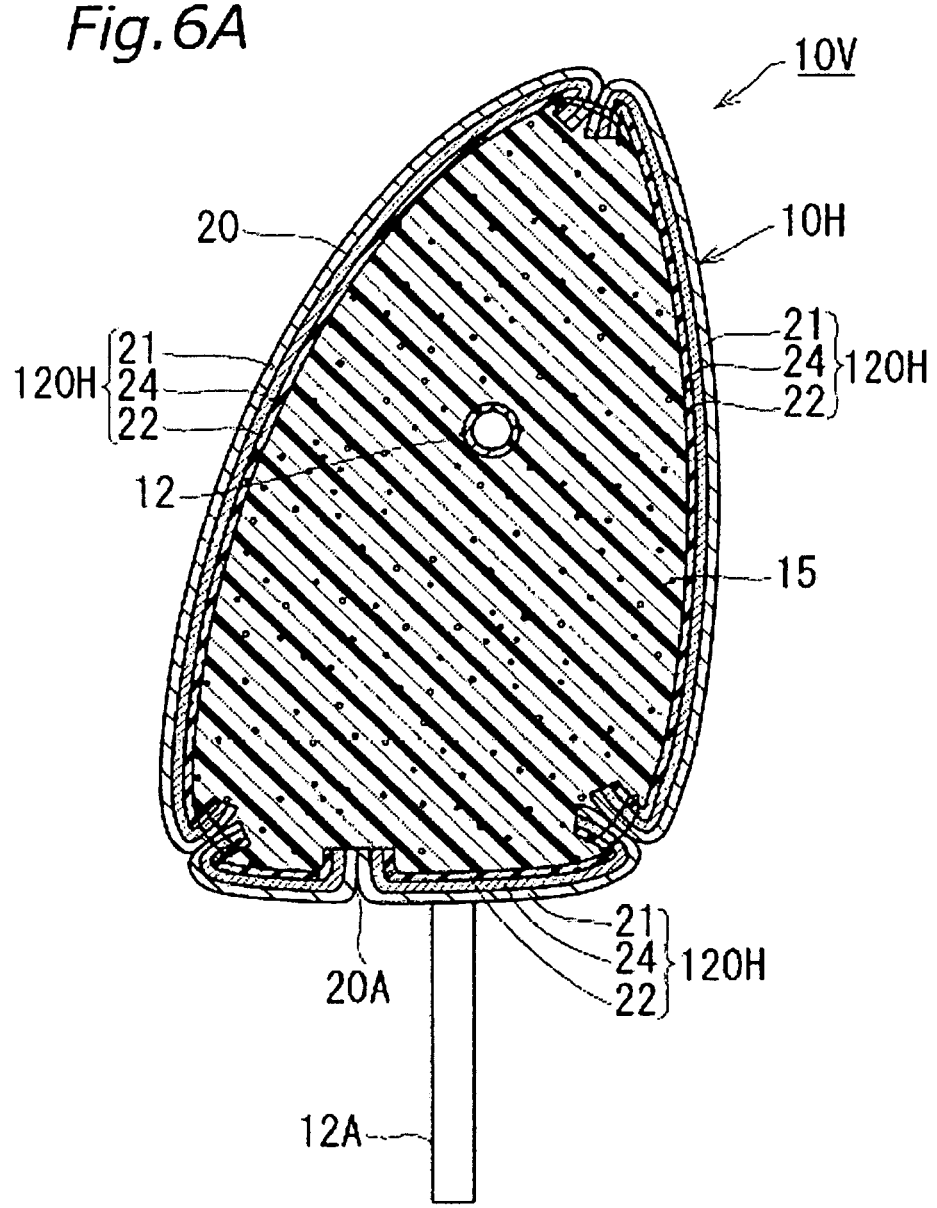

SKIN FOAM-IN-PLACE FOAMED ARTICLE AND PRODUCTION METHOD THEREOF

TECHNICAL FIELD

The present invention relates to a skin foam-in-place foamed article and a production method thereof.

BACKGROUND ART

It is known that liquid polyurethane is put in a bag-like outer material having a top layer and a liner layer of a polyurethane sheet to foam polyurethane and form a pad to obtain a skin foam-in-place foamed body such as a head rest or the like. However, in such a production method, since the polyurethane sheet is an open cell structure, liquid polyurethane might penetrate the polyurethane sheet in some cases. If a portion of the liquid polyurethane solidifies inside the polyurethane sheet and a plurality of small resin pieces are formed inside the outer material, the touch feeling is impaired.

Therefore, the polyurethane film was stuck on the inside of the polyurethane sheet to prevent the liquid polyurethane from penetrating the polyurethane sheet. Furthermore, in order to prevent the liquid polyurethane from leaking out from the stitches of the polyurethane sheet sewn into a bag, a seal of polyurethane film was stuck on a seam. However, such a method is costly.

CITATION LIST

Patent Literature

[PTL 1] JP-A-2002-210271

SUMMARY OF INVENTION

Technical Problem

Therefore, the present inventor previously proposes a use of a polyethylene sheet having a closed cell structure instead of a polyurethane sheet having an open cell structure (refer to PTL 1). Since the polyethylene sheet has the closed cell structure, a liquid polyurethane does not enter the inside of the polyethylene sheet, and leakage of the liquid polyurethane from a seam is unlikely to occur.

Initially, the present inventor has studied forming a foamed body of polyethylene in a large block shape, then slicing the foamed body to obtain a plurality of foamed polyethylene sheets and forming a liner layer with the foamed polyethylene sheet. This is because it is expected that a bonding strength between the foamed polyethylene sheet and the polyurethane serving as the pad is enhanced since the cut surface is moderately roughened when cutting the foamed polyethylene sheet from the large polyethylene foamed body. However, as a result of intensive research, the present inventor has found that the bonding strength between a foamed sheet and the polyurethane serving as the pad does not increase by such a method. Further, it is conceivable to increase the bonding strength between the foamed sheet and the polyurethane serving as the pad by subjecting a corona treatment and a surface modification treatment. However, if the corona treatment is applied to such a foamed sheet, a through-hole is generated in a bulk layer by streamer corona generated during the corona treatment. Therefore, when foaming the polyurethane serving as the pad, foaming gas was likely to escape from the polyethylene sheet to the outside, and it was difficult to obtain a good foamed body.

Therefore, it is an object of the present invention to provide a skin foam-in-place foamed body having a good touch feeling, a good foaming condition of a pad, and a good bonding strength between a liner layer and the pad, and a production method thereof.

Solution to Problem

According to an aspect of the present invention, there is provided a skin foam-in-place foamed article comprising:
a pad made of a foamed resin; and
a bag-like outer material that is integrated with the pad and covers the pad,
wherein the outer material comprises: a top layer; and a liner layer made of a foamed resin, which is integrated with the top layer,
the liner layer made of a foamed resin has a closed cell structure,
the liner layer made of a foamed resin comprise a pad-side skin layer having a density higher than that of a bulk layer, on a side of the pad, and
a corona treatment is applied to the pad-side skin layer.

According to another aspect of the present invention, there is provided a method of producing a skin foam-in-place foamed article comprising a pad made of a foamed resin, and a bag-like outer material integrated with the pad and covering the pad, the method comprising, in this order:
forming a sheet-like liner layer with a foamed resin having a closed cell structure, in which a skin layer having a density higher than that of a bulk layer is formed on each of a front surface and a rear surface;
subjecting the skin layer positioned on the rear surface to a corona treatment;
bonding a top layer to the front surface of the liner layer to obtain the outer material;
processing the outer material into a bag shape so that the liner layer is on an inside; and
injecting a liquid foamed resin material into the inside of the bag-like outer material and foaming and curing the foamed resin material to obtain the pad.

Advantageous Effects of Invention

According to the present invention, there is provided a skin foam-in-place foamed body having the good touch feeling, the good foaming condition of the pad, and the good bonding strength between the liner layer and the pad, and the production method thereof.

BRIEF DESCRIPTION OF DRAWINGS

FIG. 6A is a cross-sectional view of a headrest according to a second embodiment.

DESCRIPTION OF EMBODIMENTS

First Embodiment

Figure 1A:
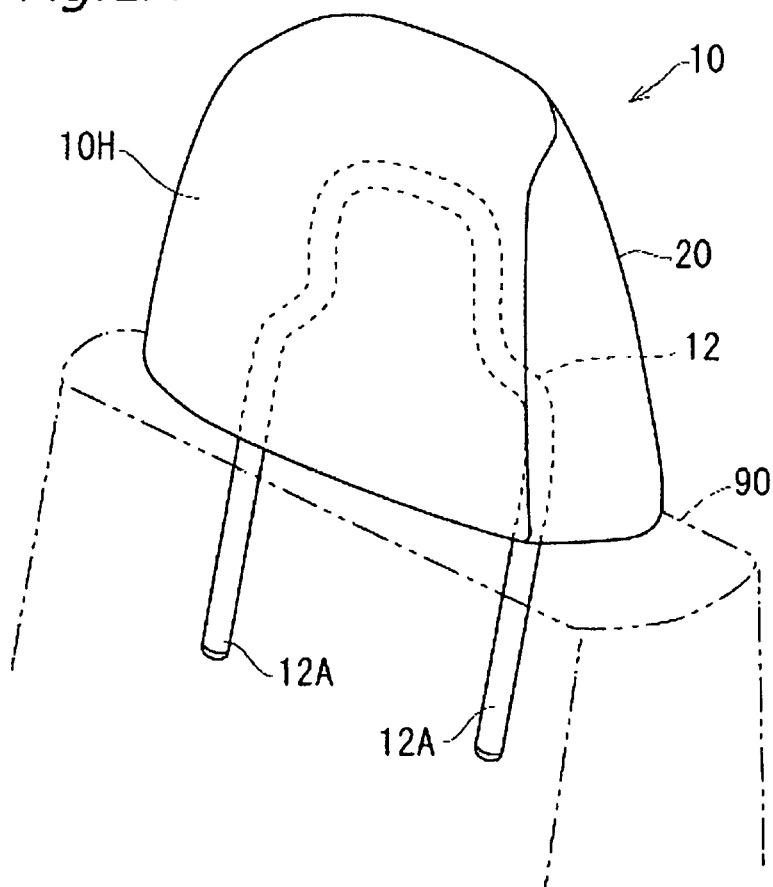
FIG. 1A is a perspective view of a headrest according to a first embodiment of the present invention.

Hereinafter, a first embodiment in which the present invention is applied to a headrest of a vehicle seat will be described with reference to FIGS. 1A to 5. As illustrated in FIG. 1A, a headrest 10 (example of a skin foam-in-place foamed article) of the present embodiment is provided with a headrest main body 10H and a gate-shaped stay 12. A top portion of the stay 12 is embedded in the headrest main body 10H. A leg portion 12A of the stay 12 protrudes from a bottom portion of the headrest main body 10H. The leg portion 12A of the stay 12 can be fixed to an upper portion of a vehicle seat 90.

Figure 1B:
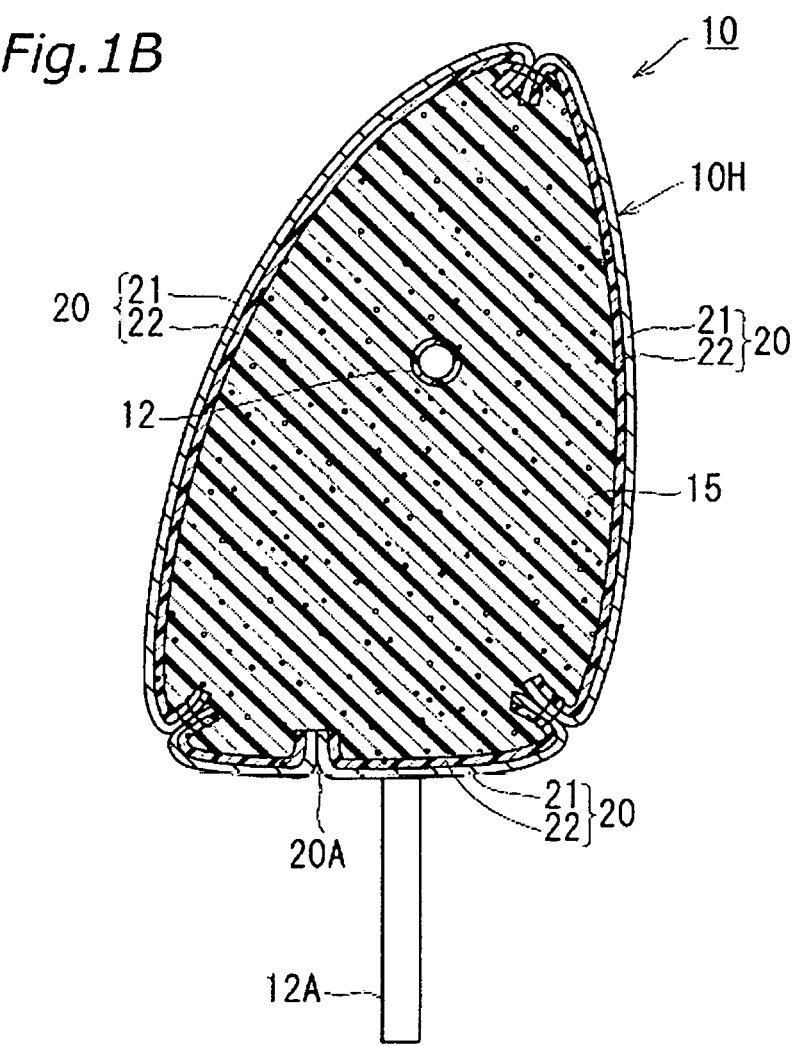
FIG. 1B is a cross-sectional view of the headrest according to the first embodiment of the present invention.

As illustrated in FIG. 1B, the headrest main body 10H has a pad 15 formed of urethane foam and an outer material 20. The outer material 20 is provided outside the pad 15. The outer material 20 is integrated with the pad 15. The outer material 20 has a bag shape covering the pad 15. The top portion of the stay 12 is embedded in the pad 15.

Figure 2:
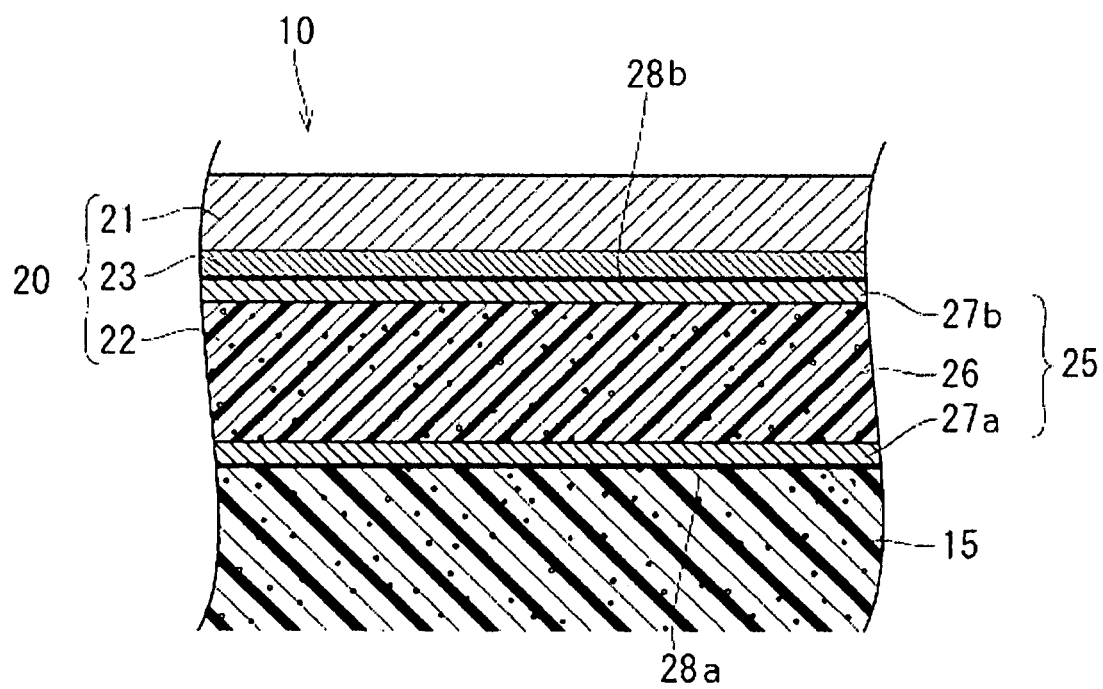
FIG. 2 is a partial cross-sectional view of the headrest.

As illustrated in FIG. 2, the outer material 20 has a top layer 21 and a liner layer 22. The liner layer 22 is integrated with the top layer 21 via an adhesive layer 23. The liner layer 22 is bonded to the pad 15. The top layer 21 is formed of, for example, a fabric sheet, a synthetic leather sheet, a genuine leather sheet, or the like. The liner layer 22 is formed of a foamed sheet 25 made of a foamed polyethylene having a closed cell structure. A foaming ratio of the foamed sheet 25 is preferably 10 times to 50 times. The adhesive layer 23 can be formed by, for example, an adhesive or a hot melt.

The liner layer 22 is integrally provided with a bulk layer 26, a pad-side skin layer 27a, and a top-side skin layer 27b. The bulk layer 26 is provided between the pad-side skin layer 27a and the top-side skin layer 27b. The pad-side skin layer 27a is provided on a front surface of the bulk layer 26 on the side of the pad 15. The top-side skin layer 27b is provided on the side of the top layer 21 of the bulk layer 26. In the following description, in a case of referring to the pad-side skin layer 27a and the top-side skin layer 27b without discrimination, it may be referred to as a skin layer 27 in some cases.

The skin layer 27 is a layer having a density higher than that of the bulk layer 26. The skin layer 27 is formed of a film in which air bubbles smaller than closed cells formed in the bulk layer 26 are gathered or which is formed into a resin during foam molding of the foamed sheet 25. The closed cell structure means a structure in which bubbles in a foamed resin are not continuous with adjacent bubbles.

A corona treatment is applied to the pad-side skin layer 27a, and the wettability of an outermost surface 28a on the side of the pad 15 is set to 45 [dyn/cm] or more. Preferably, the wettability is set to 60 [dyn/cm] or more.

The pad-side skin layer 27a is bonded to the pad 15 at the outermost surface 28a. The outermost surface 28a of the pad-side skin layer 27a is directly bonded to the urethane resin of the pad 15 without using an adhesive or the like.

The corona treatment is applied to the top-side skin layer 27b and the wettability of an outermost surface 28b on the side of the top layer 21 is set to 45 [dyn/cm] or more. The top-side skin layer 27b is adhered to the top layer 21 at the outermost surface 28b. The outermost surface 28b of the top-side skin layer 27b is adhered to the top layer 21 via the adhesive layer 23 as described above.

Next, a production method of the headrest 10 will be described with reference to FIGS. 3A to 5.

Figure 3A:
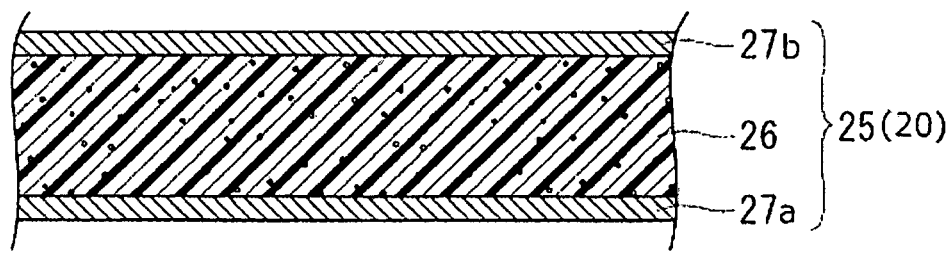
FIG. 3A is a cross-sectional view of a foamed sheet.
Figure 3B:
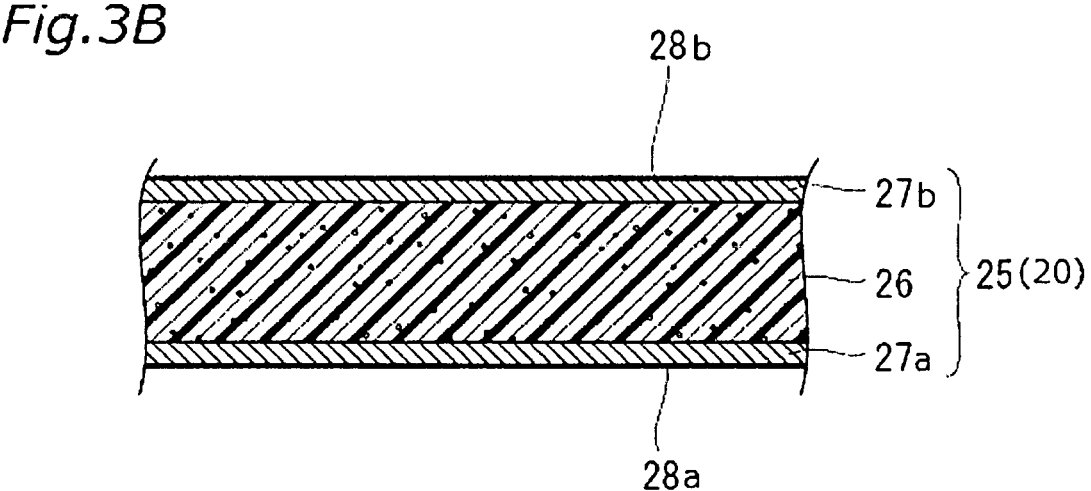
FIG. 3B is a cross-sectional view of the foamed sheet after a corona treatment.

First, as illustrated in FIG. 3A, the sheet-like foamed sheet 25 in which the skin layer 27 having a higher density than that of the bulk layer 26 is formed on a front surface and a rear surface is formed of foamed polyethylene having the closed cell structure. The foamed sheet 25 can be continuously formed by, for example, extrusion molding. When forming the foamed sheet 25 by foaming and curing the polyethylene resin raw material, the front surface and the rear surface of the foamed sheet 25 in contact with a mold and a roller are solidified in a fine bubble state as the resin is cooled on the front surface of the mold or the like, or the polyethylene resin foaming material is cured in film form. In this manner, the skin layer 27 can be formed on the front surface and the rear surface of the foamed sheet 25. In a case of forming the skin layer 27 in this manner, when the thickness of the foamed sheet 25 is 1.5 mm to 3 mm, the skin layer 27 having a thickness of 50 μm to 500 μm can be formed.

The foamed sheet 25 becomes the liner layer 22 in a later step. In the later step, since the skin layer formed on the front surface of the foamed sheet 25 becomes the top-side skin layer 27b, the skin layer formed on the front surface is referred to as the top-side skin layer 27b. In the later step, since the skin layer formed on the rear surface of the foamed sheet 25 becomes the pad-side skin layer 27a, the skin layer formed on the rear surface is referred to as the pad-side skin layer 27a.

Next, the corona treatment is applied to the foamed sheet 25 so that the pad-side skin layer 27a and the top-side skin layer 27b have the wettability of 45 [dyn/cm] or more. Although even when the corona treatment is applied, appearance changes a little, in FIG. 3B, for ease of understanding, the outermost surfaces of the skin layers 27a and 27b subjected to the corona treatment and improved in the wettability are illustrated as 28a and 28b.

A known technique can be used for the corona treatment itself. The corona treatment is a type of a surface modification treatment. For example, when the foamed sheet 25 is placed between two plate-like electrodes and a high voltage is applied between the electrodes, a streamer corona is generated between the two electrodes via the foamed sheet 25. The high-energy electrons generated thereby cleave a main chain and a side chain of a polymer bond of the foamed sheet 25 to generate a polar functional group. As a result, the surface of the foamed sheet 25 is activated to increase the wettability. The wettability can be evaluated by a test method specified in JIS K6768.

For example, the wettability of the surface of normal foamed polyethylene not subjected to the corona treatment is approximately 36 [dyn/cm]. In addition, the wettability of the surface of normal foamed polypropylene not subjected to the corona treatment is also approximately 36 [dyn/cm]. By adjusting the time for the corona treatment, the voltage applied between the electrodes, the wettability can be increased to a predetermined value.

Figure 3C:
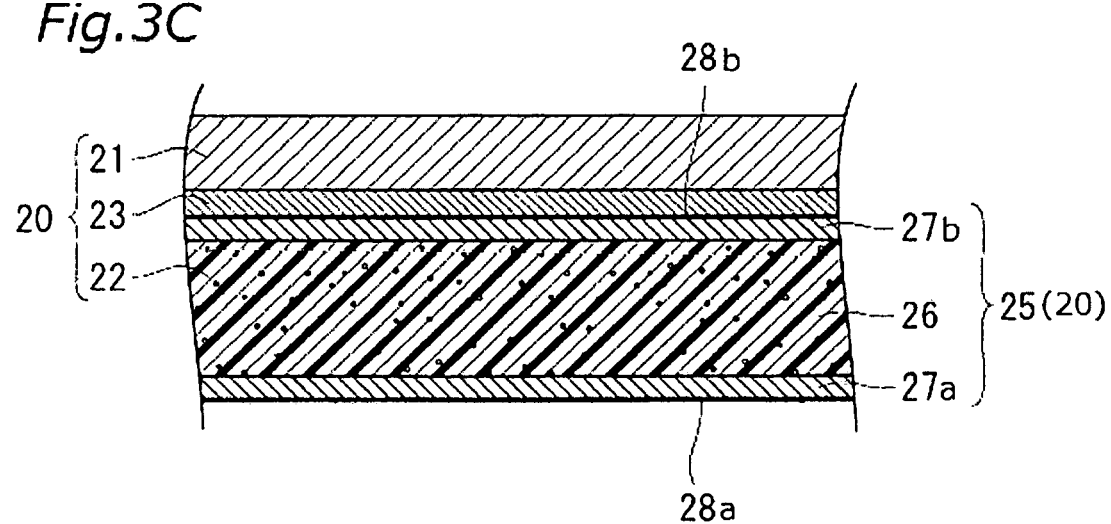
FIG. 3C is a cross-sectional view of an outer material.

Next, as illustrated in FIG. 3C, the outer material 20 is obtained by bonding the top layer 21 to the top-side skin layer 27b of the foamed sheet 25 using the adhesive, the hot melt or the like. By this step, the foamed sheet 25 becomes the liner layer 22. Since the top-side skin layer 27b having the enhanced wettability is formed on the front surface of the foamed sheet 25, the adhesive or the molten resin are satisfactorily bonded to the foamed sheet 25. Therefore, a bonding strength between the liner layer 22 and the adhesive layer 23 is increased, and the outer material 20 in which the liner layer 22 and the top layer 21 are bonded with high strength is obtained.

Next, the outer material 20 is processed into a bag shape so that the liner layer 22 is on the inside. Before processing into the bag shape, the outer material 20 may be cut into a plurality of small pieces 20H as necessary to sew the small pieces 20H into the bag shape (refer to FIG. 1B). More specifically, first, the outer material 20 is sewn in the bag shape so that the liner layer 22 is on the outside. At this time, a part of the portions to be connected are not sewn each other and is made to be an opening 20A. Next, if the bag is turned upside down using this opening 20A, it is possible to obtain the outer material 20 in which the stitches are positioned inside. If the opening 20A is formed so as to be disposed at a portion covering the lower surface of the pad 15 (refer to FIG. 1B), an appearance design of the headrest 10 is not impaired Next, the outer material 20 and the stay 12 are set on the mold 30 (refer to FIG. 4). The outer material 20 is disposed so that the opening 20A faces upward. The stay 12 is disposed so that the leg portion 12A faces upward, and the top portion is positioned inside the bag-like outer material 20. As the mold 30, a known mold used for skin foam-in-place foam molding can be used. For example, the mold 30 has a movable mold 32 that is rotatable with respect to a fixed mold 31. Lid molds 33 and 34 are rotatably provided on the top of the fixed mold 31 and the movable mold 32.

Figure 4:
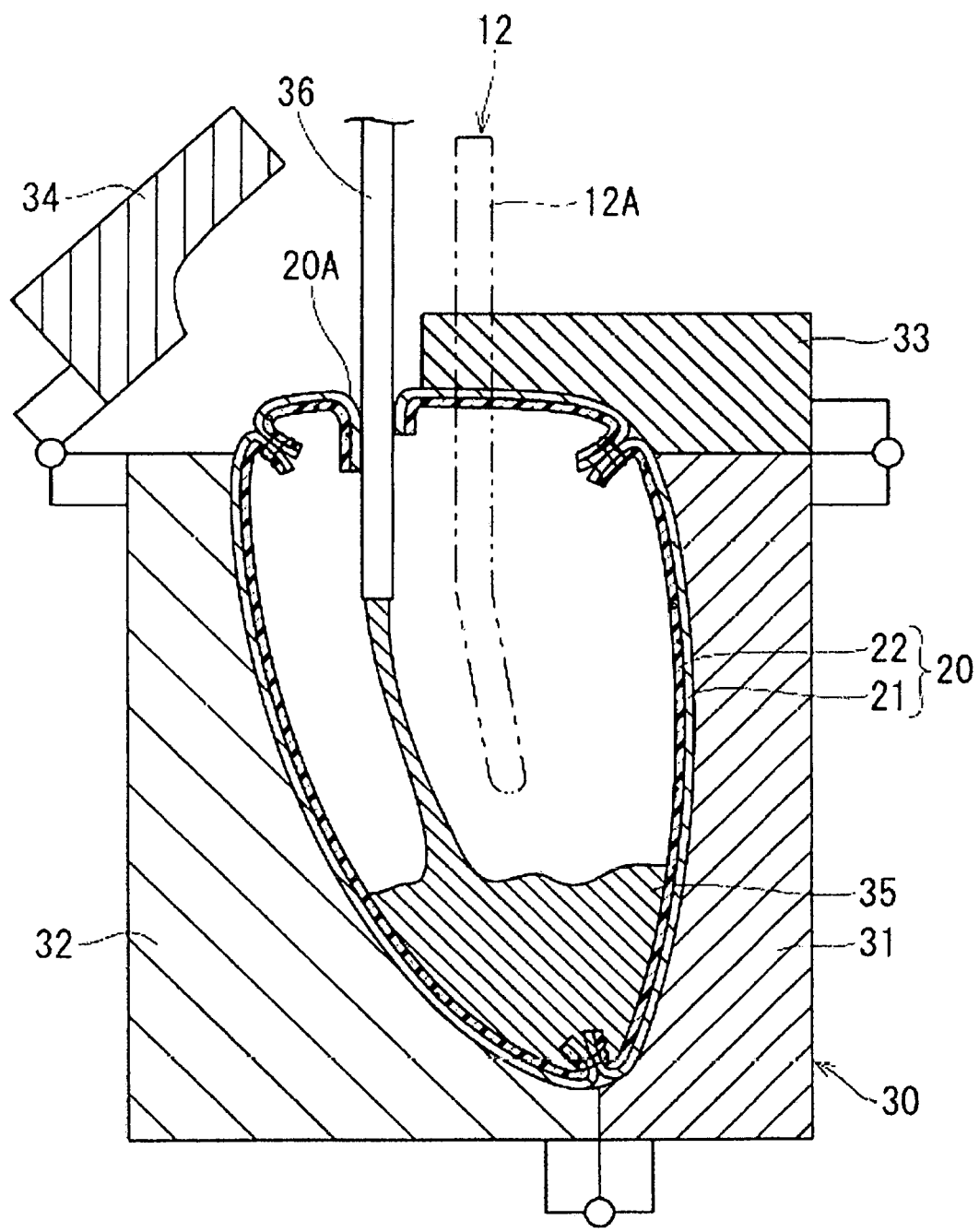
FIG. 4 is a cross-sectional view illustrating an inside of a mold when a foamed urethane material is injected into the outer material.

Next, the nozzle 36 is advanced into the outer material 20 from the opening 20A, and a foamed urethane material 35 is injected from the nozzle 36 (refer to FIG. 4).

Figure 5:
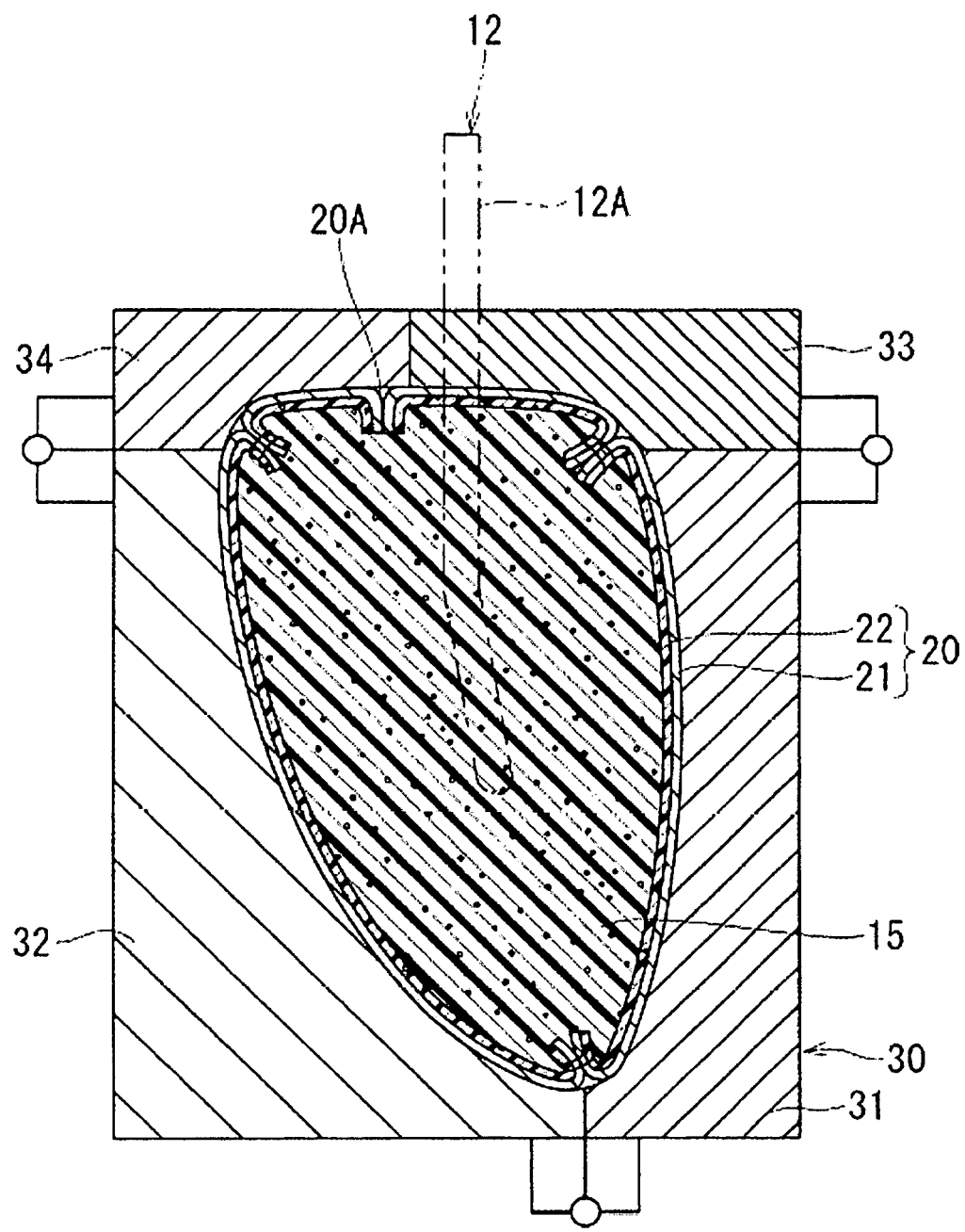
FIG. 5 is a cross-sectional view illustrating the inside of the mold after the foamed urethane material is foamed and cured.

Next, the foamed urethane material 35 is foamed and cured in the outer material 20 to form the pad 15 (see FIG. 5). Since the wettability of the outermost surface 28a of the pad-side skin layer 27a of the outer material 20 is enhanced, the pad 15 satisfactorily adheres to the liner layer 22. At this time, since a through hole due to the corona treatment is not opened in the bulk layer in the liner layer 22, the foaming gas is unlikely to pass through the liner layer 22, and the pad 15 can be satisfactorily foamed. When the molded product is released from the mold 30, the headrest 10 in which the outer material 20 is integrated with the pad 15 is obtained.

Here, the pad 15 in which the foamed urethane material 35 is foamed and cured has a foam density of 0.025 g/cm$^3$ to 0.100 g/cm$^3$. If the foam density is less than 0.025 g/cm$^3$, the cushioning property is impaired, and the return of the pad 15 becomes worse when a load is applied and then the load is removed. In addition, if the foaming density exceeds 0.100 g/cm$^3$, the pad 15 becomes heavy.

Next, the action and effect of the headrest 10 and the production method thereof according to the present embodiment will be described. According to the headrest 10 (one example of skin foam-in-place foamed article) and the production method thereof of the present embodiment, the liner layer 22 has the closed cell structure and the pad-side skin layer 27a is provided on a side of the pad. In addition, the pad-side skin layer 27a has a higher density than that of the hulk layer 26. This skin layer prevents the formation of the through hole in the bulk layer occurring during the corona treatment, so that gas and liquid are unlikely to pass through the pad-side skin layer 27a. Therefore, when a liquid foamed resin material to be the pad 15 is injected into the bag-like outer material 20, the liquid foamed resin material is unlikely to leak out to the bulk layer 26 or the top layer 21 via the pad-side skin layer 27a. As a result, it is likely to obtain the skin foam-in-place foamed article having the good touch feeling. In addition, when forming the pad 15 by foaming and curing the liquid foamed resin material, the foaming gas is unlikely to leak out to the bulk layer 26 and the top layer 21 through the pad-side skin layer 27a. As a result, the pad 15 with good foaming condition is obtained.

When the pad-side skin layer 27a provided on the side of the pad in this manner has high density, the liquid foamed resin material is unlikely to permeate into the inside of the pad-side skin layer 27a and the bulk layer 26 located further inward thereof, so that an anchor effect cannot be expected. Therefore, there is concern that the bonding strength between the pad 15 and the liner layer 22 may decrease. In addition, as described above, since the front surface of the pad-side skin layer 27a is smooth, the anchor effect also does not occur, and there is concern that the bonding strength between the pad 15 and the liner layer 22 may decrease.

However, the present inventor has found experimentally that the wettability of the pad-side skin layer 27a can be enhanced by the corona treatment, the formation of the through hole by the corona treatment can be prevented, and good bonding strength between the pad 15 and the liner layer 22 can be obtained. As a result, the good bonding strength between the pad 15 and the outer material 20 can be secured.

Normally, when a block-like foamed material having a thickness is obtained and then the foamed material is sliced into a plurality of sheets in the thickness direction, a foamed sheet having no skin layer can be obtained. If the corona treatment is applied to such a foamed sheet, the through-hole is generated in the bulk layer by streamers corona generated during the corona treatment. In this manner, the liquid or gas easily passes through the skin layer.

In addition, according to the production method of the embodiment, since the foamed sheet 25 can be used in the later step without cutting the foamed sheet 25 in the thickness direction after forming the foamed sheet 25 continuously, it is easy to reduce a production cost of the headrest 10.

In addition, in the skin foam-in-place foamed article of the above-described embodiment, the liner layer 22 may be integrally provided with top-side skin layer 27b having a higher density than that of the bulk layer 26, and a wettability of 45 [dyn/cm] or more by the corona treatment on the surface of the side of the top layer 21. In addition, in the production method of the skin foam-in-place foamed article of the above-described embodiment, before the step of obtaining the outer material 20 by bonding the foamed sheet 25 to the top layer 21 after the step of forming the foamed sheet 25 to be the liner layer 22, the corona treatment may be performed so that the wettability of the skin layer (top-side skin layer 27b) positioned on the front surface is 45 [dyn/cm] or more.

In addition to the pad-side skin layer 27a, even with the top-side skin layer 27b, it is possible to prevent formation of the through hole during the corona treatment on the top side, and cause it difficult for gas and liquid to pass through the liner layer 22. As a result, when the liquid foamed resin material to be the pad 15 is injected into the inside of the outer material 20, it is possible to reliably prevent the foamed resin material from penetrating into the top layer 21. In addition, when the foamed resin material to be the pad 15 is foamed and cured in the inside of the outer material 20, the gas is more unlikely to be leaked out to the outside, and the pad 15 with good foaming condition is more likely to be obtained.

In addition, in the skin foam-in-place foamed article of the above-described embodiment, the wettability of the pad-side skin layer 27a may be set to 60 [dyn] or more. The wettability is further enhanced, and the bonding strength between the liner layer 22 and the pad 15 is more likely to be increased.

Second Embodiment

Figure 6B:
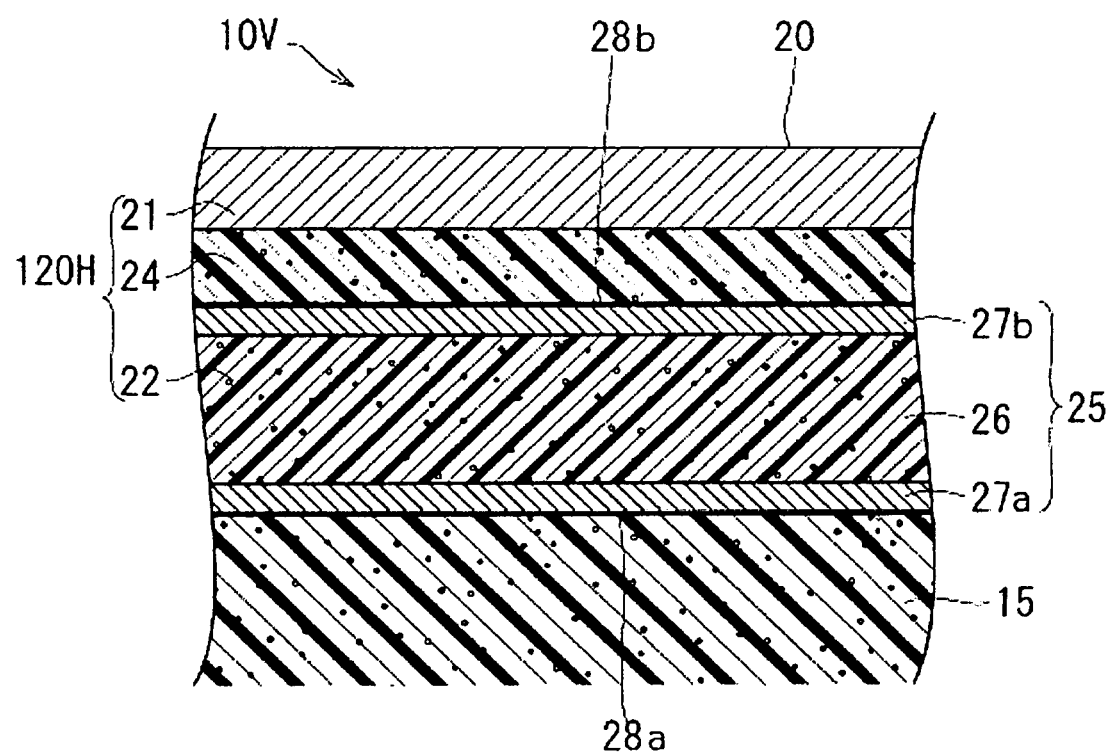
FIG. 6B is a partial cross-sectional view of the headrest according to the second embodiment.
Figure 7A:
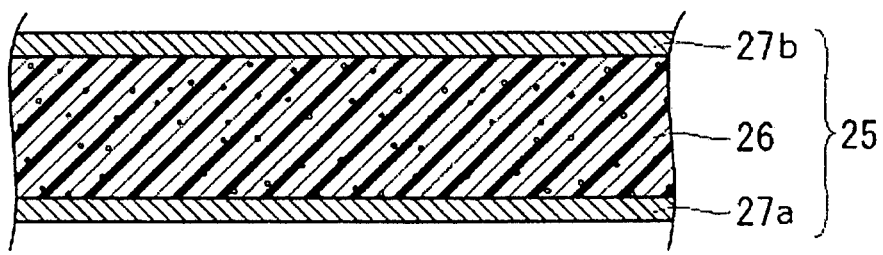
FIG. 7A is a view illustrating a manufacturing step of the headrest.

Hereinafter, a second embodiment of the present invention will be described with reference to FIGS. 6 to 7. This embodiment is a modification of the above first embodiment, and the structure of the top layer in the outer material is different from that in the above first embodiment. Specifically, as illustrated in FIGS. 6A and 6B, in a headrest 10V of the present embodiment, the fact that a top layer 21 and a liner layer 22 are bonded to each other with a urethane slab 24 is different from that in the above-described first embodiment. Since other configurations of the headrest 10V are the same as those of the headrest 10 of the above first embodiment, the same reference numerals are given to omit the description.

Next, a production method of the headrest 10V will be described. First, similarly to the above first embodiment, a sheet-like foamed sheet 25 having a skin layer 27 with a higher density than that of a bulk layer 26 on the front surface and the rear surface is formed of a foamed resin having a closed cell structure.

Figure 7B:
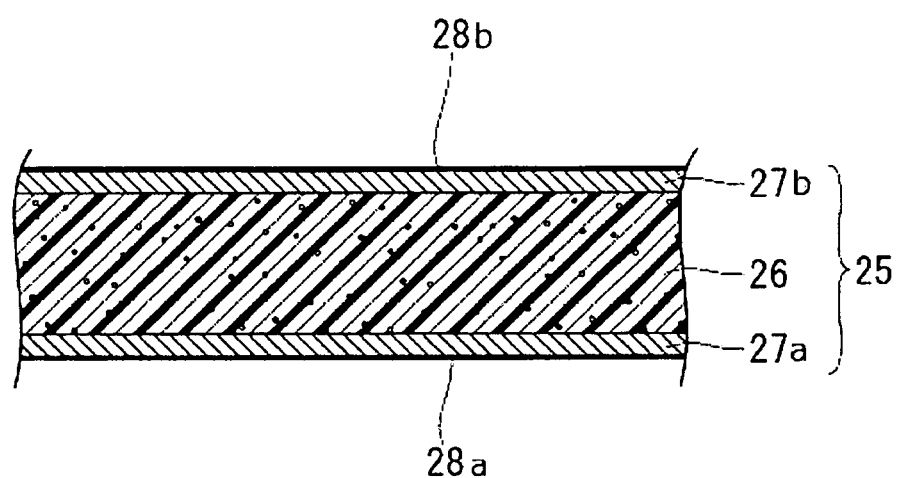
FIG. 7B is a view illustrating the manufacturing step of the headrest.
Figure 7C:
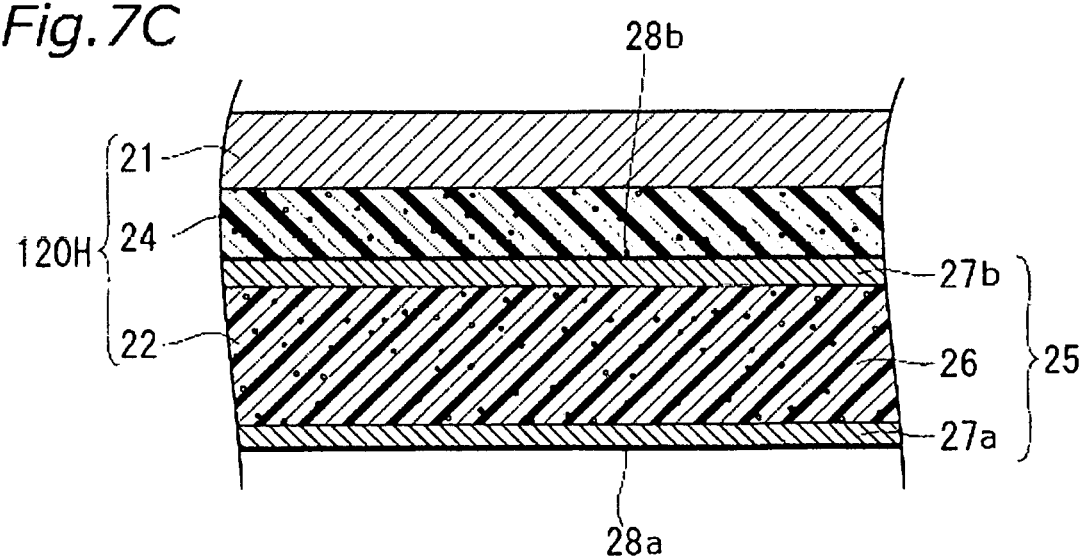
FIG. 7C is a view illustrating the manufacturing step of the headrest.

Next, the corona treatment is applied to the foamed sheet 25 so that the wettability of the skin layer on the front surface and the rear surface becomes 45 [dyn/cm]. The outermost surfaces of the skin layers 27a and 27b subjected to the corona treatment in FIGS. 6B, 7B, and 7C are illustrated by 28a and 28b.

Subsequently, the urethane slab 24 is interposed between the top layer 21 and the foamed sheet 25 by a flame laminate method to be integrally bonded to form an outer material 120H (refer to FIG. 7C). The frame lamination method is a method in which the urethane slab 24 is covered with a fire and the front surface thereof is melted and solidified in a state where the melted portion is pressed against the front surface of the top layer 21 and the foamed sheet 25 to integrate the urethane slab 24 and the top layer 21 or the liner layer 22. At this time, since the wettability of the top-side skin layer 27b of the liner layer 22 is high, the bonding property between the top layer 21 and the liner layer 22 can be enhanced.

The foamed sheet 25 obtained in this manner is processed into a bag shape to obtain the outer material 20. The foamed urethane material 35 is injected into the inside of the bag-like shape, and the foamed urethane material 35 is foamed and cured to obtain the headrest 10V (refer to FIGS. 4 and 5 of first embodiment). According to the embodiment, it is also possible to achieve the same effect as the first embodiment.

Other Embodiment

The present invention is not limited to the above-described embodiment, and for example, embodiments as described below are also included in the technical scope of the present invention, and furthermore, various modifications can be made within the scope not deviating from the gist other than the following.

In the above description, the skin layer 27 is formed on both the front surface and the rear surface of the foamed sheet 25, but the skin layer 27 may be formed at least on the rear surface of the foamed sheet 25. If the pad-side skin layer 27a is formed on the rear surface of the foamed sheet 25, it is possible to obtain a pad in good foaming condition by performing the corona treatment on the pad-side skin layer 27a to increase the bonding strength with the pad 15 and causing gas and liquid hard to pass through.

Although the foamed resin forming the liner layer and the foamed resin forming the pad may be the same as each other, it is preferable that the foamed resin forming the pad is formed of a resin of an open cell structure and the foamed resin forming the liner layer is formed of a closed cell structure resin. In general, it may be difficult to obtain good bonding strength between different resins. However, according to the skin foam-in-place foamed article of the present embodiment, since the pad-side skin layer has high wettability, even if the foamed resin forming the liner layer and the foamed resin forming the pad are different resins, good bonding strength can be obtained. In the above embodiment, although the foamed sheet 25 is formed of foamed polyethylene, the foamed sheet 25 may be formed of an olefin based foamed resin such as foamed polypropylene or the like as long as the foamed sheet 25 is formed of a foamed resin having a closed cell structure, for example.

In the above embodiment, although the "skin foam-in-place foamed article" of the present invention is the headrest 10, 10V, it may be, for example, an armrest, a seat cushion, a seat back, or the like.

In the second embodiment, the outer material 120H is formed by the frame lamination method, but it may be performed by bonding such as the adhesive or the hot melt.

EXAMPLE

The headrests of Sample Nos. 11 to 13 were prepared and the foaming conditions of the pads were evaluated by the presence or absence of the skin layer. The results are illustrated in Table 1.

Sample No. 11: Corona treatment was applied to both sides of a polyethylene foamed sheet having a skin layer on both sides at a density of 33 [kg/m$^3$]. The corona treatment was performed under the condition that the discharge amount was 0.8 kW and the feed speed was 5 m/min. An outer material having the foamed sheet as a liner layer was prepared, a foamed resin material as a pad was injected into the inside of the bag-like outer material, and the foamed resin material was foamed and cured to prepare a headrest of Sample No. 11. The top layer of the outer material is a fabric (fabric of polyester). The headrest of Sample No. 11 were evaluated for the foaming condition of the pad.

Sample No. 12: Corona treatment was applied under the same condition as Sample 11 on the side of the pad of a polyethylene foamed sheet having a skin layer only on the side of the pad at a density of 33 [kg/m$^3$]. Similarly to Sample No. 11, an outer material having the foamed sheet as a liner layer was prepared, a foamed resin material as a pad was injected into the inside of the bag-like outer material, and the foamed resin material was foamed and cured to prepare a headrest of Sample No. 12. The top layer of the outer material is a fabric (fabric of polyester). The headrest of Sample No. 12 was evaluated for the foaming condition of the pad.

Sample No. 13: Corona treatment was applied under the same condition as Sample 11 on both sides of a polyethylene foam sheet having no skin layer at a density of 33 [kg/m$^3$]. Similarly to Sample No. 11, an outer material having the foamed sheet as a liner layer was prepared, a foamed resin material as a pad was injected into the inside of the bag-like outer material, and the foamed resin material was foamed and cured to prepare a headrest of Sample No. 13. The top layer of the outer material is a fabric (fabric of polyester). The headrest of Sample No. 13 was evaluated for the foaming condition of the pad.

The obtained results are illustrated in Table 1. The foaming condition of the pads was good in both of Sample Nos. 11 and 12. In addition, leakage of foaming material or the like and exudation into the top layer does not confirmed. The foaming condition of the pad was poor in Sample No. 13. The exudation of the foaming material into the top layer was observed. In addition, the outer material was partially cured due to exudation of the foaming material into the top layer. From the above results, it was confirmed that if at least the pad-side skin layer was provided on the outer material, a pad in a good foaming condition could be obtained.

TABLE 1

| Sample No. | Presence or absence of skin layer | Foaming condition |
|---|---|---|
| 11 | Pad-side skin layer and top-side skin layer | OK |
| 12 | Only pad-side skin layer | OK |
| 13 | No skin layer | NG |

Next, Headrests of Sample Nos. 21 to 24 were prepared and the outer material was detached from the pad by applying a force of a predetermined magnitude to evaluate a joining strength between the outer material and the pad. The results are illustrated in Table 2.

Sample No. 21: Sample No. 21 is the same headrest as Sample No. 11. A surface tension of the front surface on the side of the pad of the outer material was 45 [dyn/cm]. As a result of a detachment test, the pad and the outer material did not easily detached. In addition, when the detached surface is observed, although the interface between the pad and the outer material is partially broken, it was also confirmed that a portion where the breakage occurred in the pad without breakage of the interface due to the high joining strength of the interface. As described above, it was confirmed that the headrest of Sample No. 21 had a joining strength sufficient for practical use.

Sample No. 22: Corona treatment was applied to both sides of a foamed sheet made of polyethylene having a skin layer on both sides at a density of 32 [kg/m$^3$] to form an outer material, and a headrest of Sample No. 22 was prepared using the obtained outer material. The corona treatment was performed under the condition that the discharge amount was 0.8 kW and the feed speed was 5 m/min. The surface tension of the front surface on the side of the pad of the outer material was 48 [dyn/cm]. As a result of the detachment test, it was confirmed that the outer material was not detached from the pad with an applied detachment force and the headrest of Sample No. 22 had a joining strength sufficient for practical use. When the detachment force was further increased, the pad portion was substantially broken and the outer material was detached off. That is, since the joining strength of the interface between the pad and the outer material is high, breakage of the interface is unlikely to occur and the breakage substantially occurs in the pad.

Sample No. 23: Corona treatment was applied to both sides of a foamed sheet made of polyethylene having a skin layer on both sides at a density of 42 [kg/m$^3$] to form an outer material, and a headrest of Sample No. 23 was prepared using the obtained outer material. The corona treatment was performed under the condition that the discharge amount was 0.8 kW and the feed speed was 5 m/min. The surface tension of the front surface on the side of the pad of the outer material was 65 [dyn/cm]. As a result of the detachment test, it was confirmed that the outer material was not detached from the pad with an applied detachment force and the headrest of Sample No. 23 had a joining strength sufficient for practical use. When the detachment force was further increased, only the pad portion was broken and the outer material was detached off. That is, since the joining strength of the interface between the pad and the outer material is high, breakage of the interface is not occurred and the breakage occurs only in the pad.

Sample No. 24: Corona treatment was not applied to a foamed sheet made of polyethylene having a skin layer on both sides at a density of 33 [kg/m$^3$] to form an outer material, and a headrest of Sample No. 24 was prepared using the obtained outer material. The surface tension of the front surface on the side of the pad of the outer material was 36 [dyn/cm]. As a result of the detachment test, it was confirmed that the liner layer of the outer material was easily detached from the pad and the headrest of Sample No. 24 had a joining strength insufficient for practical use. When the detached surface is observed, it was confirmed that the interface between the pad and the liner layer of the outer material was broken and that the interface was broken because the joining strength of the interface was low. It is considered that the surface tension became insufficient and the joining strength decreased since the corona treatment was not applied to the pad-side skin layer.

From the above results, it was confirmed that sufficient joining strength can be obtained if the corona treatment is performed so that the surface tension of the pad-side skin layer is 45 [dyn/cm] or more. In addition, it was confirmed that more preferable joining strength can be obtained if the corona treatment is performed so that the surface tension of the pad-side skin layer is 60 [dyn/cm] or more.

TABLE 2

| Sample No. | Surface tension [dyn/cm] | Joining strength |
|---|---|---|
| 21 | 45 | OK |
| 22 | 48 | OK |
| 23 | 65 | OK |
| 24 | 36 | NG |

REFERENCE SIGNS LIST 10, 10V headrest (skin foam-in-place foamed article)
15 pad
20 outer material
21 top layer
22 liner layer
25 foamed sheet
27a pad-side skin layer
27b top-side skin layer
35 foamed urethane material (foamed resin)

The invention claimed is:

1. A skin foam-in-place foamed article comprising:
a pad made of a foamed resin;
a bag-like outer material that is integrated with and covering the pad,
wherein the bag-like outer material comprises a top layer and a sheet-like liner layer integrated with the top layer and formed into a bag shape such that the liner layer is on an inside;
the liner layer comprises a bulk layer, a top-side skin layer on a front surface of the bulk layer, and a pad-side skin layer on a rear surface of the bulk layer, wherein the bulk layer and the top-side and pad-side skin layers are provided integrally in a foamed resin having a closed cell structure, the top-side and pad-side skin layers each having a density higher than that of the bulk layer are formed during foam molding of the liner layer such that closed cells of each the top-side and pad-side skin layers are smaller than closed cells formed in the bulk layer,
wherein the liner layer has a thickness of 1.5 to 3 mm and the top-side and pad-side skin layers each has a thickness of 50 μm to 500 μm; and
a corona treatment applied to enhance a wettability of an outermost surface of the pad-side skin layer in contact with the pad.

2. A skin foam-in-place foamed article according to claim 1, further comprising a corona treatment applied to enhance a wettability of an outermost surface of the top-side skin layer.

3. A skin foam-in-place foamed article according to claim 2, wherein the enhanced wettability of each of the pad-side skin layer and the top-side skin layer is 45 dyn/cm or more.

4. A skin foam-in-place foamed article according to claim 3, wherein the enhanced wettability is 60 dyn/cm or more.

5. A skin foam-in-place foamed article according to claim 1, wherein the outermost surface of the pad-side skin layer is directly bonded to the foamed resin of the pad without using an adhesive.

6. A skin foam-in-place foamed article according to claim 2, wherein the liner layer is integrated with the top layer via an adhesive layer applied to the outermost surface of the top-side skin layer, wherein an increased bonding strength between the liner layer and the adhesive layer is due to the corona treatment enhanced wettability of the outermost surface of the top-side skin layer.

7. A skin foam-in-place foamed article according to claim 2, wherein a through-hole due to the corona treatment is not opened in the bulk layer.

8. A skin foam-in-place foamed article according to claim 1, wherein the foamed resin of the pad is a foamed urethane material and the foamed resin of the liner layer is an olefin-based foamed resin.

9. A skin foam-in-place foamed article according to claim 8, wherein the olefin-based foamed resin is foamed polyethylene or foamed polypropylene.

10. A skin foam-in-place foamed article according to claim 8, wherein the foamed urethane material has a foam density of 0.025 $g/cm^3$ to 0.1 $g/cm^3$.

11. A headrest of a vehicle seat comprising the skin foam-in-place article of claim 1.

12. The headrest according to claim 11, further comprising a gate-shaped stay, wherein a top portion of the stay is embedded in the pad and a leg portion of the stay protrudes from a bottom portion of the skin foam-in-place article for mounting on an upper portion of the vehicle seat.

13. A method of producing a skin foam-in-place foamed article comprising a pad made of a foamed resin, and a bag-like outer material integrated with and covering the pad, the method comprising, in this order:
forming a sheet-like liner layer that comprises a bulk layer and a top-side skin layer formed on a front surface of the bulk layer and a pad-side skin layer formed on a rear surface of the bulk layer, the bulk layer and the top-side and pad-side skin layers are provided integrally in a foamed resin having a closed cell structure, the top-side and pad-side skin layers each having a density higher than that of the bulk layer are formed during foam molding of the liner layer such that closed cells of each the top-side and pad-side skin layers are smaller than closed cells formed in the bulk layer, wherein the foam molding comprises foaming and curing a resin raw material while the front and rear surfaces are contacted,
wherein the liner layer has a thickness of 1.5 to 3 mm and the top-side and pad-side skin layers each has a thickness of 50 μm to 500 μm;
subjecting an outermost surface of the pad-side skin layer to a corona treatment to enhance a wettability thereof;
integrating a top layer and the liner layer to obtain an outer material;
forming the outer material into a bag shape such that the liner layer is on an inside to obtain the bag-like outer material;
injecting a liquid foamed resin into the inside of the bag-like outer material and foaming and curing to obtain the pad made of the foamed resin.

14. The method of producing the skin foam-in-place foamed article according to claim 13, further comprising subjecting an outermost surface the top-side skin layer to a corona treatment to enhance a wettability thereof.

15. The method of producing the skin foam-in-place foamed article according to claim 14, wherein the corona treatment is performed such that the enhanced wettability of each of the pad-side skin layer and the top-side skin layer is 45 dyn/cm or more.

16. The method of producing the skin foam-in-place foamed article according to claim 15, wherein the corona treatment is performed such that the enhanced wettability of each of the pad-side skin layer and the top-side skin layer is 60 dyn/cm or more.

17. The method of producing the skin foam-in-place foamed article according to claim 13, wherein the injecting the liquid foamed resin is performed such that the outermost surface of the pad-side skin layer is directly bonded to the foamed resin of the pad without using an adhesive.

18. The method of producing the skin foam-in-place foamed article according to claim 14, wherein the integrating the top layer and the liner layer is performed via an adhesive layer applied to the outermost surface of the top-side skin layer, wherein an increased bonding strength between the liner layer and the adhesive layer is due to the corona treatment enhanced wettability of the outermost surface of the top-side skin layer.

19. The method of producing the skin foam-in-place foamed article according to claim 13, wherein the foamed resin of the pad is a foamed urethane material and the foamed resin of the liner layer is an olefin-based foamed resin, wherein the olefin-based foamed resin is foamed polypropylene or foamed polyethylene.

20. The method of producing the skin foam-in-place foamed article according to claim 19, wherein the foamed urethane material has a density of 0.025 $g/cm^3$ to 0.1 $g/cm^3$.

21. The method of producing the skin foam-in-place foamed article according to claim 13, wherein the corona treatment does not open a through hole in the bulk layer.

* * * * *